(No Model.)
B. K. RIGBY.
MANUFACTURE OF CEMENT.
No. 523,645. Patented July 24, 1894.
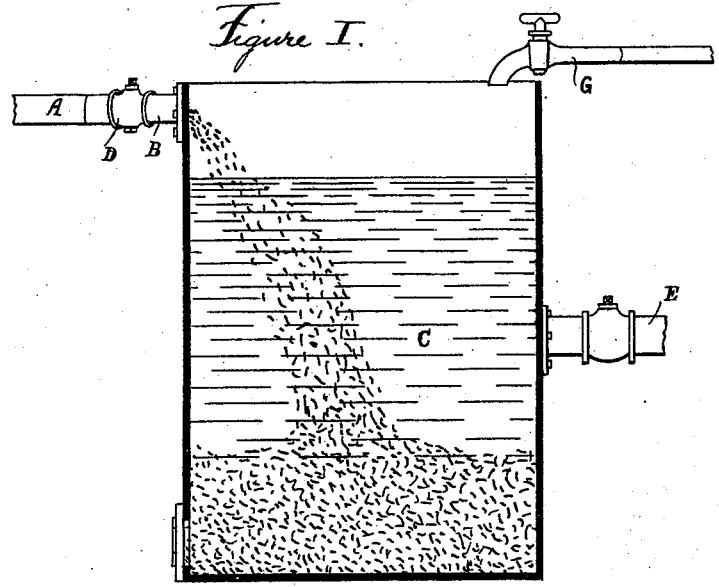
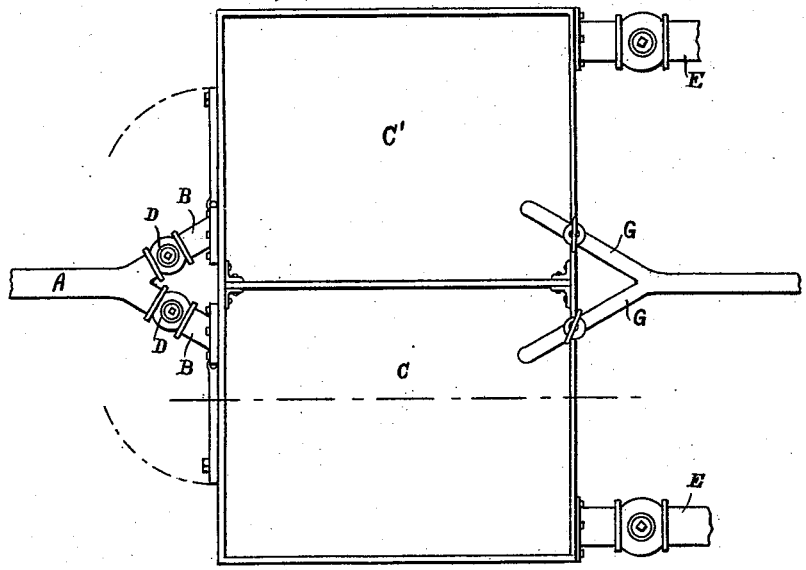
Witnesses.
M. V. Bidgood
L. Hoolsey
Inventor.
Brierley Kelsall Rigby
By [signature]
Attys.

UNITED STATES PATENT OFFICE.

BRIERLEY KELSALL RIGBY, OF DITTON, ASSIGNOR OF ONE-HALF TO FRANCIS AUGUSTUS REMINGTON NEILL, OF ST. HELENS, AND AUSTIN COOPER CARR, OF RAINHILL, ENGLAND.

MANUFACTURE OF CEMENT.

SPECIFICATION forming part of Letters Patent No. 523,645, dated July 24, 1894.

Application filed October 17, 1893. Serial No. 488,407. (No specimens.)

*To all whom it may concern:*

Be it known that I, BRIERLEY KELSALL RIGBY, a subject of the Queen of Great Britain, residing at Ditton, near Widnes, in the county of Lancaster, in the Kingdom of England, have invented certain new and useful Improvements in the Manufacture of Cement, of which the following is a specification.

Several patents have been taken out for making cement out of ammonia soda and Chance alkali waste, but all of them have so far failed to achieve industrial success. This has been owing mainly to the large amount of impurities present in the material and the difficulty experienced in extracting or neutralizing these impurities. Now these impurities can be divided into two portions; first, those readily soluble in water, such as chlorides, secondly, those insoluble or soluble with difficulty, such as calcium sulphate. The readily soluble ones can be, to a considerable extent, washed out, but the others have hitherto been supposed to require chemical treatment involving too great expense to make the invention sufficiently profitable for industrial application. Now, I have discovered that, so long as the quantity of these insoluble ingredients be brought under from three to three and one-half per cent., they have little or no effect on the strength of the cement.

Referring to the accompanying drawings, which form a part of this specification:—Figure I is a vertical sectional view. Fig. II is a top view of the apparatus used in my process.

In the drawings: A is the supply conduit from the alkali works: B, B two branches; C, C' two deep vats; D, D valves of any convenient type; E, E drawing off pipes placed about at various distances from the bottom of the tank; G, G water supply.

The hot mixture of waste and water fresh from the Chance process, or the waste from the Solvay process mixed with water is run direct from the alkali works through conduit A into tank C which is about three quarters filled with water. The finely divided waste gradually settles to the bottom. During the settling, most of the easily soluble impurities are washed out and remain behind in the water. When the tank is full, the supply is shut off from C and directed to the other tank C'. After sufficient settling, the supernatant water is run off and fresh water added till the tank is three quarters full, the current of waste and water is again charged and tank C' treated in like manner. When the waste accumulates sufficiently high, the tanks are disconnected from the supply and emptied, and the supply can be, if desired, directed into another pair of tanks. By this arrangement, the waste is very cheaply and effectively washed. The washed waste is now tested chemically, and the amount of impurity, exclusive of water and sodium chloride, ascertained by chemical analysis. A sufficient quantity of lime in the form of caustic lime, carbonate or hydrate is added to bring the percentage of such impurities down to about three per cent. or under of the weight of the waste calculated in a dry state. The material is now used instead of chalk—is mixed with clay or other aluminous material and formed into cement by calcination, grinding and exposing in the ordinary manner.

I declare that what I claim is—

The process of manufacturing cement from "ammonia soda" or "Chance" waste, which consists in washing the waste, chemically testing the solid matter, and adding lime as described until the impurities other than water and sodium chloride are under three and one-half per cent., then mixing with aluminous materials, calcining, grinding and exposing in the usual manner.

In testimony whereof I have signed my name to this specification in the presence of two subscribing witnesses.

BRIERLEY KELSALL RIGBY.

Witnesses:
W. P. THOMPSON,
W. H. BEESTON.